(12) United States Patent  
Lewin et al.

(10) Patent No.: US 8,285,138 B2  
(45) Date of Patent: Oct. 9, 2012

(54) OPTICAL CORRELATION APPARATUS

(75) Inventors: Andrew Charles Lewin, Worcestershire (GB); David Arthur Orchard, Worcestershire (GB); Martin James Cooper, Worcestershire (GB)

(73) Assignee: Qinetiq Limited, London (GB)

( * ) Notice: Subject to any disclaimer, the term of this patent is extended or adjusted under 35 U.S.C. 154(b) by 790 days.

(21) Appl. No.: 12/518,767

(22) PCT Filed: Dec. 17, 2007

(86) PCT No.: PCT/GB2007/004850  
§ 371 (c)(1),  
(2), (4) Date: Jun. 11, 2009

(87) PCT Pub. No.: WO2008/075021  
PCT Pub. Date: Jun. 26, 2008

(65) Prior Publication Data  
US 2010/0040380 A1 Feb. 18, 2010

(30) Foreign Application Priority Data  
Dec. 16, 2006 (GB) .................................. 0625108.6

(51) Int. Cl.  
*H04B 17/00* (2006.01)  
*G02F 2/00* (2006.01)  
*G02F 1/01* (2006.01)

(52) U.S. Cl. ............. 398/16; 398/17; 398/25; 398/174; 398/175; 398/176; 398/177; 708/191; 708/831

(58) Field of Classification Search ............... 398/16, 398/17, 25, 174–177; 708/191, 831  
See application file for complete search history.

(56) References Cited

U.S. PATENT DOCUMENTS  
3,215,981 A 11/1965 Golay  
(Continued)

FOREIGN PATENT DOCUMENTS  
EP 1 004 954 A1 5/2000  
(Continued)

OTHER PUBLICATIONS  
Hauer et al.; "Optically Assisted Internet Routing Using Arrays of Novel Dynamically Reconfigurable FBG-Based Correlators;" *Journal of Lightwave Technology*; 2003; pp. 2765-2778; vol. 21; No. 11.  
(Continued)

*Primary Examiner* — Danny Leung  
(74) *Attorney, Agent, or Firm* — Oliff & Berridge, PLC (57) ABSTRACT

An optical correlation apparatus is described which forms first and second parallel optical signals in response to a serial input data stream. The first parallel optical signal is arranged to have bright pulses represent binary 1 and the second parallel optical signal is arranged to have bright pulses represent binary 0. A channel select means, such as an optical switch or amplitude modulator, deselects or blocks channels in the first parallel optical signal which correspond to binary 1 in a reference data string and also deselects or blocks channels in the second parallel optical signal which correspond to binary 0 in the reference data string. The remaining optical signals are combined at one or more detectors. Where the input data matches the reference data string each bright pulse in the first and second parallel optical signals is deselected and the detector registers zero intensity. However when there is any mismatch at least one channel will pass a bright pulse to the detector. An instance of zero intensity can therefore be used as an indication of pattern match.

20 Claims, 6 Drawing Sheets

U.S. PATENT DOCUMENTS

| | | | |
|---|---|---|---|
| 3,441,724 A | 4/1969 | Taylor | |
| 3,482,101 A | 12/1969 | Slaymaker | |
| 4,735,486 A * | 4/1988 | Leib | 359/19 |
| 5,024,508 A * | 6/1991 | Horner | 359/561 |
| 5,262,968 A * | 11/1993 | Coffield | 708/5 |
| 5,671,090 A * | 9/1997 | Pernick et al. | 359/561 |
| 6,178,020 B1 * | 1/2001 | Schultz et al. | 359/107 |
| 6,222,754 B1 * | 4/2001 | Goto et al. | 365/125 |
| 6,327,171 B1 * | 12/2001 | Goto et al. | 365/125 |
| 6,819,807 B2 * | 11/2004 | Garner et al. | 385/1 |
| 6,930,775 B1 * | 8/2005 | Spremo et al. | 356/328 |
| 2004/0136640 A1 | 7/2004 | Shahar et al. | |
| 2008/0258946 A1 * | 10/2008 | Lewin | 341/100 |
| 2009/0034969 A1 * | 2/2009 | Lewin et al. | 398/43 |
| 2010/0027087 A1 * | 2/2010 | Lewin et al. | 359/107 |

FOREIGN PATENT DOCUMENTS

| | | |
|---|---|---|
| GB | 2 419 208 A | 4/2006 |
| WO | WO 2006/043057 A2 | 4/2006 |

OTHER PUBLICATIONS

Tancevski et al.; "Incoherent asynchronous optical CDMA using gold codes;" *Electronics Letters*; 1994; pp. 721-723; vol. 30; No. 9.

* cited by examiner

OPTICAL CORRELATION APPARATUS

This invention relates to improvements to an apparatus for pattern recognition using optical correlation techniques.

Pattern recognition is concerned with the process of recognising one or more known objects or sequences in incoming data, for example DNA chains, text or imagery, by comparing known reference object(s) with the data. An ideal way to perform pattern recognition autonomously is through the mathematical operation of correlation. This patent is concerned with an improved correlator employing optical techniques for very high speed operation.

There are many areas in which pattern recognition is used, from interrogating databases to locate specific search terms to biometric based recognition systems and target identification in two-dimensional imagery. Often the search is performed digitally using a suitably programmed processor to compare a known reference data string with the data to be searched, in order to identify a match. One example is an internet search engine which compares one or more input reference words with internet data to identify a match.

When searching very large amounts of data, however, software based pattern identification techniques may be slow or require very large processing power. Also when data is received at high data rates, for example at telecommunications data transfer rates, software based systems may be unable to perform correlation at this speed.

Recently it has been proposed to apply the benefits of optical correlation to high speed pattern matching. Our patent application PCT/GB2005/004028, published as WO2006/043057, describes a correlator apparatus that uses fast phase modulation and parallel optical processing to allow high speed correlation.

Figure 1:
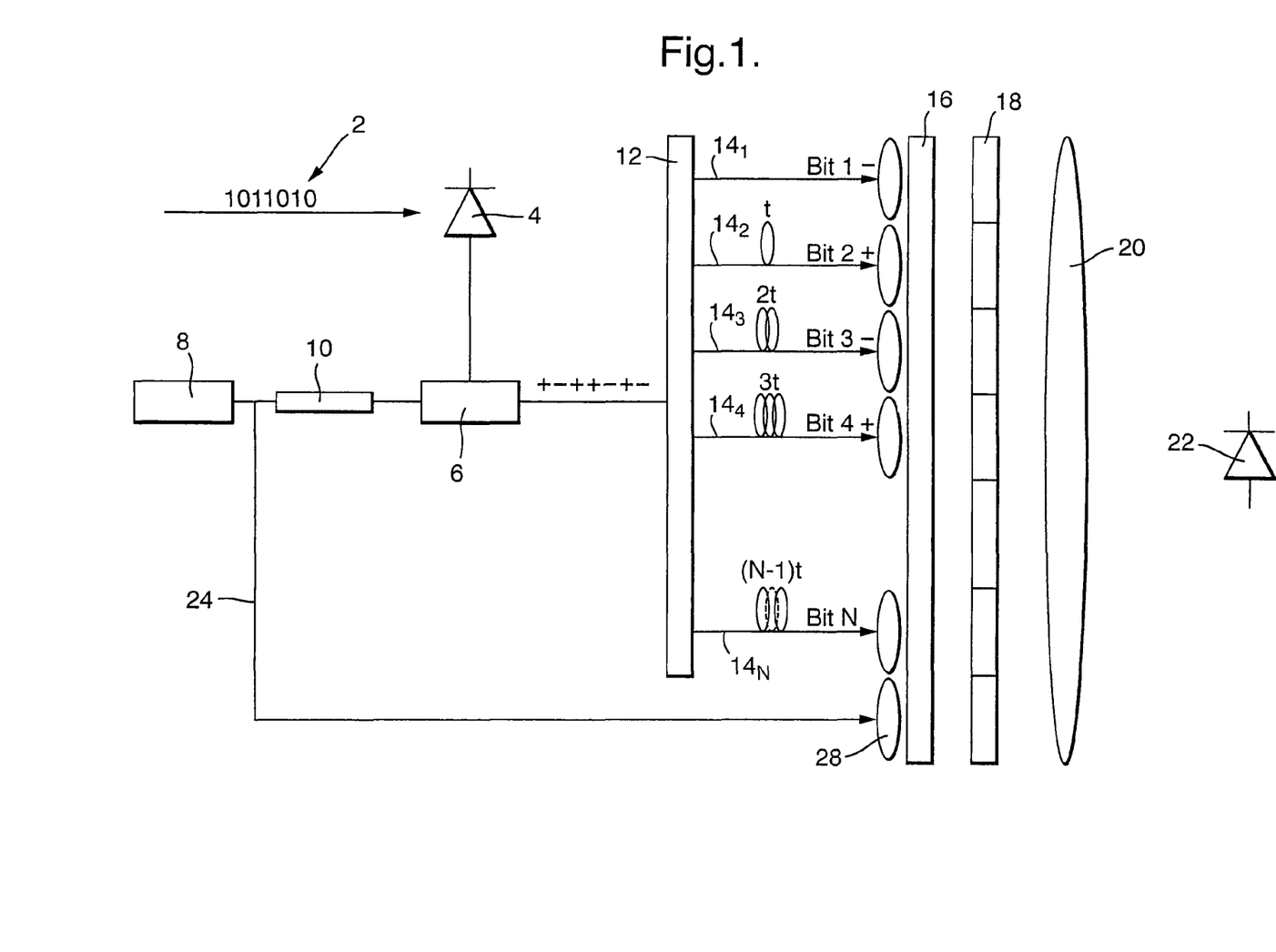
FIG. 1 shows a first embodiment of a correlator as described in WO2006/043057.

FIG. 1 shows a first embodiment of this fast optical correlator. The correlator acts on a temporal or sequential input data stream 2. This data stream may be, for instance, in the form of an amplitude modulated binary optical signal such as is used in telecommunications and may be streamed from a database to be searched for the existence of certain data. The amplitude modulated input signal 2 is detected by a photodetector 4. The detected data is used to control a phase modulator 6 which modulates the phase of a stable laser 8 to create a temporal binary phase modulated optical signal. High speed phase modulators exist in the field of telecommunications and can deal with very high input data rates. However the data could be input in any form, for instance it may arrive as amplitude modulated electric signals and these may be used directly to control phase modulator 6.

The phase modulated optical data signal is divided into a plurality of optical channels. In this embodiment each optical channel comprises a length of optical fibre $14_1$-$14_N$. Each of the fibre optical channels has a different delay length, each fibre having an incremental delay compared to the previous fibre related to the bit rate of the system, the delay being equal to the time between successive bits in the data stream. Thus at the output of the fibres 14 the first fibre will output the phase modulated signal equivalent to one particular bit whereas the next fibre, which has an increased delay, will output the phase modulated signal for the previous bit and so on. Therefore the output of each fibre will be a different bit in the signal. The apparatus therefore converts the temporal optical signal into a parallel optical phase signal. Optical delay means other than optical fibres can also be used.

The output of each fibre 14 is directed by a lens 28 onto part of a phase modulating spatial light modulator (SLM) 18. The spatial light modulator 18 displays a phase modulation pattern corresponding to at least one reference pattern (or its inverse)—the reference pattern corresponding to some reference data which is sought.

The phase of any one optical channel of the signal exiting the SLM will therefore depend on the phase modulation applied for that particular bit of input data and also the phase modulation for that part of the reference pattern. The phase modulations applied are designed such that where there is no correlation between the input data and the reference data the phase of the various channels in the resulting optical signal will vary randomly and hence the signal will have a wavefront with varying phase. However, where the reference pattern exactly matches (or is the exact opposite of) the input data, the result will be that every optical channel has the same phase, in other words a plane wavefront will be produced. The system is preferably designed with binary phase modulation such that for each optical channel having a match between the input data and reference data the phase modulation applied results in a first phase state and for each channel having a mismatch between the input and reference data the phase modulation applied results in a second phase state, the first and second phase states being 180° out of phase.

The resulting optical signal is focussed by lens 20 to a point detector 22. In the case of no correlation the parts of the signal with the first phase state will destructively interfere with the second phase state of the other channels (this is a binary phase system). Therefore the optical signal will not be strongly focussed to the detector 22. However where there is a correlation, all the signal is in phase (in the first phase state) and hence the signal will be strongly focussed to the detector 22. Thus the intensity of the signal detected at the detector 22 can be used as an indication of correlation.

The SLM 18 may be arranged to display more than one reference pattern—this is useful where it is desired to search for more than one reference data string or where the search string is longer than the number of optical channels. In such a case the outputs of the fibre optics may be replicated into more than one parallel optical signal by replication optics 16. Imagine the outputs of the fibre optic delay lines 14 were arranged as a linear array. Replication optics 16, for instance a Dammann grating, may replicate the linear array of outputs in the transverse direction, i.e. a 40 channel array could be replicated 40 times to form a 40×40 array of outputs where each line is a copy of the parallel optical signal. These would be directed onto the SLM which would likewise be formed into a 40×40 array of modulation areas, each line representing a particular reference pattern. Obviously each line would have to be focussed separately to its own detector and so a linear array of 40 photodetectors would be used.

Figure 2:
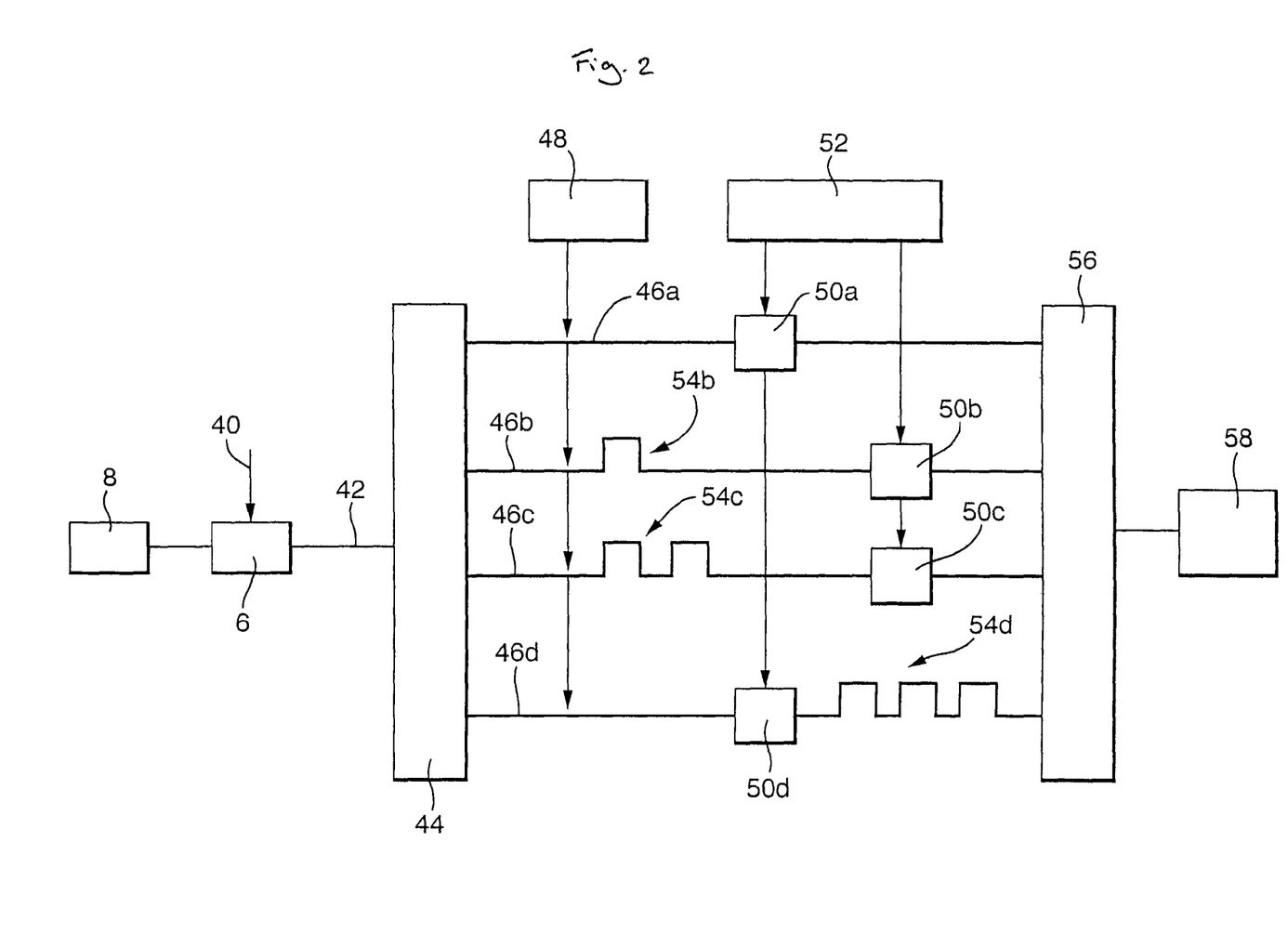
FIG. 2 shows an alternative embodiment of a correlator as described in WO2006/043057.

In another embodiment of this correlator the optical fibre delays are replaced with a series of integrated optic waveguides. FIG. 2 shows this embodiment. Here the input data stream 40 is again passed to a phase modulator 6 to phase modulate the output of laser 8 to produce a temporal phase modulated optical signal.

This signal is passed, via an input waveguide 42, to a 1-N MMI splitter 44. MMI splitter 44 is a multimode interference device which has an input waveguide 42, a multimode waveguide region and N output waveguides 46a . . . d (four are shown for ease of reference but in a working device the number of output channels may be much higher). The input optical signal excites multiple modes in the MMI device which is dimensioned such that replicas of the input are re-imaged at each of the output waveguides 46a . . . d. MMI splitters of this nature are well know in the art. Waveguides 46a . . . d are formed from any convenient material, for instance gallium arsenide, or may be free space waveguides formed in a semiconductor material such as silicon.

Amplitude modulation control 48 is provided for intensity matching to ensure optimal performance.

Each of the waveguides has a different length so as to give a different, incremental delay length in a manner similar to the different lengths of optical fibre described above, with the increment in delay from one waveguide to the next again being equal to the bit time of the incoming data. The skilled person will be well aware of how to construct waveguides of different length, for instance by incorporating additional turns 54b . . . d. The waveguides therefore convert the temporal input signal to a parallel optical data signal at the output.

However, unlike the first embodiment where the outputs of the optical fibres were passed to an SLM, each waveguide 46a . . . d has an associated phase modulator 50a . . . d controlled by phase modulator control 52. The phase modulator control controls the binary phase modulation applied to each waveguide and applies an appropriate phase modulation for a particular reference data string.

The reference phase modulation may be applied at any point in the delay line. The phase modulators need not be aligned and the delay to a particular waveguide may be applied before or after the phase modulator or both. Each waveguide having its own phase modulator means that there is no need to align the output of the optical delay means with an SLM as described above. Further any fine control to an individual channel is easy to achieve.

The phase modulators are integrated electro-optic modulators such as the skilled person would be well familiar with.

The outputs of waveguides 46a . . . d form the inputs to an MMI N-1 combiner 56. The MMI combiner couples the outputs of waveguides to a single output from the combiner which feeds to photodetector 58. Where all the inputs to the MMI combiner are in phase the signals constructively add whereas a phase mismatch with cause destructive coupling.

MMI combiner 56 therefore effectively performs the same function as lens 20. The intensity on the detector can therefore be used as an indication of correlation as described above.

The principle of replication of the parallel optical signal could also be applied to this embodiment so as to search for several different reference strings simultaneously.

The correlator apparatus described therefore effectively converts input sequential data into parallel optical data by dividing the signal into several optical channels which have successive delays. A reference phase modulation is also applied to each optical channel and when there is a correlation between the reference data and input data each channel will have the same phase which can be detected by interferometric coupling of the optical channels. This apparatus can therefore operate at high speeds as the reference data applied to the SLM or EO phase modulators is effectively fixed for a certain data pattern.

The correlator apparatus described in WO2006/043057 is a high speed correlator which offers good discrimination. However the use of phase modulation means the system is sensitive to any phase changes. Especially with regard to the first embodiment described above the temperature variations in the fibre delay lines can result in phase drift, as can temperature variation across the phase modulating SLM. Any such drift can be determined and accounted for in a calibration process but whilst being calibrated the correlator is not generally able to perform searching. Further the arrangement requires a large number of high bandwidth detectors which means that the system is relatively costly to implement.

It is therefore an object of the present invention to provide a correlation apparatus which mitigates at least some of the above mentioned issues.

Thus according to the present invention there is provided a correlation apparatus comprising a parallel optical signal generator for converting an input data stream into first and second parallel optical signals wherein the first parallel optical signal is amplitude modulated such that high intensity represents a binary 1 and low intensity represents a binary 0 and the second parallel optical signal is amplitude modulated such that high intensity represents a binary 0 and low intensity represents a binary 1, at least one detector for detecting total intensity of the first and second parallel optical signals and a channel select means for selectively preventing radiation in selected channels of the first and second parallel optical signals from reaching the detector. Typical amplitude modulators based on Mach-Zehnder configurations produce both of the required outputs from a single device. It would also be feasible to efficiently code the two orthogonal channels via switching polarisation states, potentially doubling the optical efficiency. In line with dense-wavelength-division-multiplexing (DWDM) technology, it would also be feasible to achieve the same effect by switching between two wavelength bands.

The apparatus of the present invention therefore provides a correlator which is based on amplitude modulation rather than phase modulation and which operates by intensity summing. The apparatus of the present invention produces a first amplitude modulated parallel optical signal. As would be evident to the skilled person, the term parallel optical signal refers to an optical signal which propagates along a plurality of optical channels, the signal on each channel representing, at any time, a different bit in the data stream to that on the other channels. The channels may be formed by spatial separation of the optical signal and/or each channel, and may comprise an individual waveguide forming part of that channel. The channels could also be formed through wavelength separation.

The first amplitude modulated signal is modulated such that for each channel a high intensity represents a binary 1 and low intensity a binary 0. A channel select means acts on this parallel optical signal and effectively blocks some channels so that no radiation from those channels reaches the detector. The channels which are blocked are based on a reference data pattern with a channel being blocked if the relevant part of the data pattern is a binary 1. Therefore only those channels which correspond to a binary 0 in the reference data set contribute to the detected intensity. If the first parallel optical signal does match the reference data—in that each open channel does indeed represent a binary 0—then each open channel will be low intensity and there will only be a low intensity signal at the detector. However if any of the open channels having a modulation representing a binary 1 there will be at least one high intensity output directed toward the detector. Thus a low intensity signal sum of the first parallel optical signal indicates a match for the open channels. However obviously it gives no indication of whether there is a match on the selected channels which are blocked. Therefore the apparatus of the present invention also produces a second parallel optical signal which has a high intensity representing a binary 0 and a low intensity representing a binary 1, i.e. effectively the inverse modulation of the first parallel optical signal. Again certain channels of the second parallel optical signal are blocked by the channel select means—those corresponding to data 0 in the reference data set. Therefore the only open channels are those corresponding to reference data 1. When there is a match on these channels there will again be a low intensity signal at the detector.

Therefore the apparatus of the present invention works by producing two amplitude modulated parallel optical signals, a first signal in which bright pulses indicate binary 1s and a second in which bright pulses indicate binary 0s. The channel select means acts on the optical signals and effectively blocks all channels in the first and second signals which would be bright for the desired search term. A low intensity output at the detector indicates a match, whereas for any mismatch at least one channel in the first and second optical signals will have a high intensity output.

The present invention therefore operates using amplitude modulation and simple intensity summing. This should be more stable and less sensitive to phase drift than the phase modulation correlator of WO2006/043057.

As described above the channel select means acts to block all channels in the first and second optical signals which would be high intensity in the case of a match with the search term. The apparatus could be operated in reverse and block all channels expected to be low intensity. The indication of a match would then be when the total intensity at the detector was that expected from each open channel being high intensity. However a low intensity trigger is preferred as it is less sensitive to system variation and should be more reliable.

The skilled person will understand that the terms high and low intensity are relative terms and would clearly understand how amplitude modulation of optical signals is routinely used. For the avoidance of doubt the term low intensity includes zero intensity at the wavelength or wavelengths of operation.

Conveniently the parallel optical signal generator comprises an optical source, which may be a laser, but may also be a broad-band source.

In one embodiment the parallel optical signal generator further comprises a beam divider to divide the output from the optical source into first and second beams. These beams can then be separately modulated by amplitude modulating beams to form two serial signals, which can then be converted into the first and second parallel optical signals. In this case the apparatus further comprises an amplitude modulation means for amplitude modulating the first beam in response to the input data signal to provide a first optical serial output in which a high intensity represents a binary 1 and low intensity represents a binary 0 and modulating the second beam to provide a second optical serial output in which a high intensity represents a binary 0 and low intensity represents a binary 1. The parallel optical signal generator may then further comprise an optical serial-to-parallel convertor means for converting the first serial optical signal into the first parallel optical signal and converting the second serial optical signal into the second parallel optical signal.

The optical serial-to-parallel convertor means may comprise an optical delay means having a plurality of optical delay lines, each successive delay line being incrementally delayed with respect to the previous one. The optical delay means could, for instance comprise, the fibre optic delay line array or the integrated optic waveguide array described in WO2006/043057.

This embodiment therefore produces two beams, which are separately amplitude modulated according to the modulation scheme applied to each beam. These are then converted into the first and second parallel optical signals.

Alternatively the apparatus could comprise a polarisation modulator acting on the output of the optical source to provide a polarisation modulated signal based on the input data stream. The beam divider could then comprise a polarisation sensitive beam splitter to divide the polarisation modulated into two signals based on the polarisation modulation. This will inherently create two serial optical signals, one in which high intensity represents binary 1 and the other in which high intensity represents binary 0. These two serials signals could be converted into parallel signals as described above.

The channel select means is capable of preventing radiation in certain channels of the first and second parallel optical signals from reaching the detector. The channel select means may comprise one or more amplitude modulating spatial light modulators, an array of optical switches, optical shutter array, micro-mirror array or reconfigurable mask etc. For instance the channel select means may be an amplitude modulating spatial light modulator such as a liquid crystal spatial light modulator (SLM) arranged in the optical path at the output of the optical delay means. A separate SLM could be located at the output (or input) of each optical delay means or a single SLM could be used with the outputs of the first and second optical delay means arranged to be incident on different parts of the SLM. The, or each, SLM can be addressed to be transmissive at the output of certain channels and non-transmissive at the output of other channels depending on the reference data set. Alternatively each optical delay line in the first and second optical delay means could incorporate an optical switch. It should be noted that as the SLM or switches only need to be updated when it is wished to change the reference data set, high speed optical components are not required. Similarly, either reflective or transmissive versions of SLM technology can be implemented via suitable arrangement of the optical system.

A single detector may be arranged to receive radiation from the active channel of both the first and second optical delay means (e.g. via polarisation techniques) or there may be two detectors, one arranged to receive the radiation from the active channels of the first parallel optical signal and the other arranged to receive radiation from the active channels of the second parallel optical signal.

The output from each channel of optical delay means is combined, either at the detector such as by using a lens to focus the outputs onto the detector, or prior to passing to the detector, for instance such as with an MMI combiner.

In one embodiment the optical source may be a broad-band optical source such as an amplified stimulated emission source (ASE). This broad-band output could be modulated to provide two complementary beams as described above. The optical delay means may then employ a wavelength demultiplexer such as are well known from the field of Wavelength Division Multiplexing (WDM) and Dense Wavelength Division Multiplexing (DWDM) to separate different wavelengths into the different optical delay lines. The outputs of each delay line can then be very efficiently re-combined by a multiplexer, for instance an Array Wave Guide (AWG). The output from the AWG can be passed directly to a photodetector. In this instance, it may be advantageous to use two groups of wavelength bands to represent the two parallel channels.

It would then be advantageous for the parallel optical signal generator (delay line system or serial to parallel converter) to produce several copies of the first and second parallel optical signals. This allows each set of first and second parallel optical signals to be compared with a different reference data set allowing simultaneous searching for several search terms. The different search terms may be sub-sets of a longer search term allowing searches for terms with more bits than channels of the parallel optical signals. The replication step could be done at various stages. For instance first and second serial optical signals could be produced as described above and then split into several copies each directed to a serial-to-parallel convertor. Alternatively the output of each channel of the serial to parallel convertor could be divided into several outputs appropriately arranged to provide several copies of the first and second parallel optical signals. In the WDM based solution, a third technique would be to separate, appropriately delay the respective channels and then recombine these before separating for analysis by many similar WDM assemblies which contain no delay lines.

The use of WDM is one way of enabling simpler replication of the first and second parallel optical signals for correlation with many different reference data sets in a compact apparatus. The parallel optical signal generator may therefore comprise a broad-band optical source and a polarisation modulator arranged to modulate the polarisation of the output of the optical source in response to the input data stream. The polarisation modulator is anything which can produce a polarisation modulated optical signal. It could be an electro-optic modulator which acts directly on the optical signal to modulate the polarisation thereof. Alternatively it could comprise an optical switch which directs the radiation into one of two channels depending on the input data value. Each channel has a polariser in the optical path, the polarisers in each channel being orthogonal. The outputs of the two channels may be recombined to form the polarisation modulated signal. A differential modulator as described above could be used to produce two complementary amplitude modulated signals which are incident to orthogonal inputs of a polarising beam splitter. The signal from one output will be a polarisation modulated signal. The skilled person will appreciate there are various arrangements of polarisation modulator.

A wavelength demultiplexer divides the polarisation modulated signal into a plurality of different wavelengths/ wavelength bands each wavelength being passed to a different optical delay line, the delay lines being arranged to have incremental delays to create a parallel optical polarisation modulated signal. This parallel optical signal is then multiplexed into a single optical channel with the data carried at the different wavelengths. This combined signal can then be replicated as many times as needed. Each copy can then be passed to a polarisation sensitive beam splitter which will direct the radiation to either a first or second wavelength demultiplexer depending on its polarisation. Radiation having a polarisation modulation representing a binary 1 will be directed to the first demultiplexer and that having a polarisation modulation representing a binary 0 will be directed to the second multiplexer. Thus for any particular wavelength range a binary 1 will result in a high intensity signal going to the first demultiplexer and no signal going to the second demultiplexer and vice versa for a binary 0. The demultiplexer will divide the radiation signal into its component wavelength bands and therefore the first demultiplexer produces the first parallel optical signal and the second demultiplexer produces the second parallel optical signal. The channel select means selects the appropriate channels to pass to the detector as described above.

A diffractive element can also be used with WDM and polarisation modulation to provide the first and second parallel optical signals. In this embodiment a broad-band source is polarisation modulated in response to the input signal as described above. This is then divided by a demultiplexer into a number of different wavelength bands, which are incrementally delayed before being recombined by a multiplexer. In this embodiment however the output of the multiplexer is incident on a diffractive optical system arranged to split the optical signal dependent on wavelength and polarisation so as to provide the first and second parallel optical signals, said first and second parallel optical signals being arranged to be incident on at least one reflective mode SLM, the reflective mode SLM being arranged to reflect radiation back to the diffractive optical system in any channels which would correspond to a low intensity for the desired search term.

The diffractive optical system may comprise a diffraction grating and a polarisation based splitter such as a Wollaston prism. The grating will provide a certain degree of diffraction based on the wavelength of the radiation. As the different channels were split into different wavelength band the diffractive element therefore provide separation of the parallel optical signal. A polarisation-based splitter, such as the Wollaston prism, arranged in the optical path will further split the signal to produce the two complementary parallel optical signals. At least one reflective mode SLM is arranged to reflect the radiation back to the grating or not depending on the reference data. In the same manner as described above for a transmissive SLM only those channels which would correspond to a dark pulse if the input data matched the search term are reflected back to the diffractive element. The diffraction grating will recombine any radiation reflected back thereto. The recombined signal can be arranged to be incident on the detector or onto the input end of a waveguide, for instance an optical fibre, which guides the recombined signal to the detector. There may be alignment advantages in reflecting the radiation back along the same path in which case a circulator can be arranged between the output of the multiplexer and the diffractive grating so as to pass radiation output from the multiplexer to the diffractive grating and to pass any radiation reflected back from the reflective SLM and recombined at the diffractive grating to the detector. Alternatively, use of a quarter wave plate after the Wollaston prism can be used to rotate the return polarisation, and thus deflect the return beam onto a second array of fibres. This technique saves the need for circulators, but may require more alignment effort.

When using a broad-band source the first and second parallel optical signals may be formed in different wavelength ranges. For instance the output of a broad-band source, or any source having at least two different wavelength bands, could be split into first and second different wavelength bands by a wavelength division multiplexer. An amplitude modulation means could then modulate the signal in the first wavelength band in response to the input data to provide a first optical serial output, which has binary 1s as high intensity. The amplitude modulation means would then also modulate the signal in the second wavelength band to provide a second optical serial output in which binary 0s have high intensity. The two appropriately modulated signals can then be divided into the first and second parallel optical signals respectively.

Conveniently the parallel optical signal generator comprises a 1:N demultiplexer.

A demultiplexer is a known piece of equipment for performing a serial to parallel conversion. Demultiplexers are sometimes known as serial-to-parallel converters. The demultiplexer has an input by which it receives the input data stream and N different outputs. The demultiplexer effectively stores bits as they are received until it is storing N bits, at which point it outputs a different one of the N stored bits on each of the N outputs. It then stores the next N bits from the input signal. In this way N bits of a temporal or serial input data stream are converted into a parallel data signal.

It will be apparent that the demultiplexer therefore only outputs a signal after it has received N bits and so the output rate from the demultiplexer is slower than the bit rate of the input data stream by a factor of N. The use of the demultiplexer therefore eases the requirements on the components used in the correlator with associated cost savings and increased availability and/or allows a higher data input rate.

The 1:N demultiplexer therefore turns the input data stream into a N-channel parallel data stream. Each of the N different channels of the demultiplexed input data stream could then be used to drive a modulator acting on a separate optical channel.

Were the demultiplexer to have a large number of output channels, i.e. N was large, say of the order of 40, then the parallel data signal outputs from the correlator could control N amplitude or polarisation modulators, each on a different optical channel, and produce an N optical channel parallel signal in that fashion. However most commercially available multiplexers (at the input data rates of interest, of the order of 10-40 Gigabits a second or possibly higher) tend to be limited to 1:4, 1:8 or 1:16 bit demultiplexers. Preferably commercially available demultiplexers are used and conveniently a 1:8 bit demultiplexer is used.

Therefore each optical channel may additionally comprise a beam splitter and a plurality of optical delays of incrementally increased delay, the incremental delay being equal to N times the bit rate. Thus the principle of optical delay to create a parallel signal can still be used to multiply the number of optical channels from 4 or 8 say to larger numbers. For instance with a 1:8 demultiplexer there may be 4 different optical delays on each channel to give a 32 bit parallel signal.

The optical delay means could be any suitable optical delay, for instance lengths of fibre optic or integrated optics waveguides having different path lengths.

It should be noted that whereas the correlator without a demultiplexer looked at each successive combination of m bits, where m is the number of optical channels in each parallel optical signal, the use of a demultiplexer only looks at certain snapshots of the data. In other words consider the case where there are 32 channels in each parallel optical signal. Without a demultiplexer the parallel optical signal at one time is bits 1-32. It then updates one bit time late to bits 2-33 and another bit time later to bits 3-34 and so on. With a 1:8 demultiplexer the signal at the initial time is again bits 1-32 but then it only updates eight bit times later and then corresponds to bits 9-40.

This could potentially result in some combinations of data never appearing on the parallel optical signal and hence being missed for correlation. However for several applications the data is not arbitrary and will be arranged in a meaningful form. The skilled person will appreciate that digital data is often transmitted in the form of bytes (8 bits of information) and that actually it would only be wished to search sequences which corresponded to full bytes of information. Finding a correlation between reference data and input data based on the end part of one byte and start of the next would be a false positive. Use of a demultiplexer therefore can ensure that only meaningful sequences of data are available for correlation and that every meaningful combination is presented.

The invention will now be described by way of example only with reference to the following figures of which.

FIGS. 1 and 2 show two embodiments of a correlator apparatus as described in WO2006/043057, the contents of which are hereby incorporated by reference thereto, especially the description of the first embodiment of the correlator from page 16, line 14 to page 20, line 17 and the second embodiment of the correlator described from page 24, line 1 to page 26, line 14.

Figure 3A:
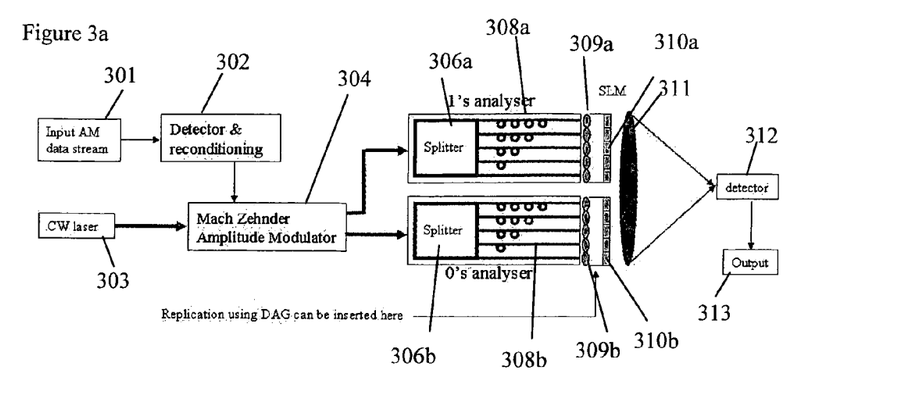
FIGS. 3a and 3b show two variants of an embodiment of the correlator of the present invention.

FIG. 3a shows an embodiment of the present invention. An input optical data stream 301 is passed to a detector/amplifier unit 302, which reconditions the received signal to provide clean on/off signals. This electrical signal is passed to a Mach Zehnder type amplitude modulator 304, which automatically provides the necessary differential outputs from continuous wave laser source 303. The differential outputs from the modulator results in one serial optical output where bright pulses represent 1s and dark pulses represent 0s and a second, which has bright pulses representing 0s and dark pulses representing 1s. The dark pulse is a pulse of significantly lower intensity than the bright pulse and may comprise a period of zero intensity.

The two outputs then pass to an optical delay means which has splitters 306a, 306b splitting the beam into a plurality of different optical delay lines 308a, 308b. Each successive delay line is incrementally delayed with respect to the previous delay line by a time equal to the bit period. The delay lines may be comprised of an array of fibre optic cables of different lengths as described in WO2006/043057. Similarly they may comprise integrated optic waveguides as described in WO2006/043057.

The output of the delay line 308a is therefore a parallel optical signal where a bright pulse represents a 1 and a dark pulse a 0. This output is focussed by lenslett array 309a onto amplitude modulating spatial light modulator (SLM) 310a. SLM 310a is addressed with a reference pattern, which corresponds to the outputs of the delay lines 308a and is addressed so as to transmit radiation in areas corresponding to a reference data value of 0 and block radiation in areas corresponding to a reference data value of 1.

Therefore if the input data and reference data values match the SLM 310a will block all the bright pulses that correspond to 1s from reaching the detector but will allow all the dark pulses representing 0s through. However should the input data value be 1 on a channel where the reference data value is 0 then a bright pulse will be transmitted by the SLM 310a. Therefore any bright pulses being passed by SLM 310a indicates an input data value of 1 where the reference data value is 0 and is therefore indicative of a mismatch. However as SLM 310a blocks all radiation on the channels corresponding to reference data 1 the output thereof clearly contains no information about these channels.

The output from delay lines 308b however is a parallel optical signal where bright pulses indicate a 0 and dark pulses indicate a 1. This parallel optical signal is focussed by lenslett array 309b onto amplitude modulating SLM 310b, which is addressed so as to block radiation in channels corresponding to a reference value of 0 and transmit radiation in areas corresponding to a reference value of 1. Thus SLM 310b will, on a match between the input data and reference data, block all bright pulses from being transmitted. Any bright pulse, representing an input data value 0, on a channel corresponding to a reference value of 1 will be transmitted.

Thus the output of SLM 310a indicates any instances of an input value 1 corresponding to a reference value 0 and the output of SLM 310b indicates any instances of an input value 0 corresponding to a reference value 1. The outputs of both SLMs are focussed by lens 311 onto a photodetector 312. On perfect match there should be no radiation reaching the detector (depending on the extinction efficiency of the amplitude modulators 304a and 304b and SLMs 310a and 310b). However any mismatch will result in the detector 312 detecting a light signal. Hence only when detector 312 detects a substantially zero intensity signal will it register a match on output 313.

Figure 3B:
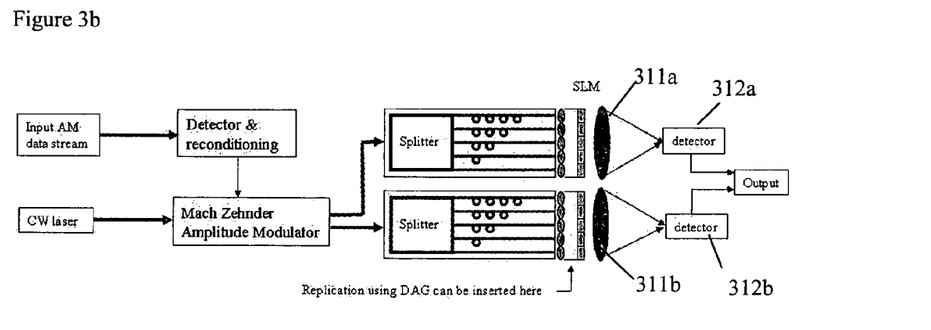

FIG. 3b shows a slight variant of this correlator where the output of each SLM 310a, 310b is focussed by a respective lens 311a, 311b onto its own photodetector 312a, 312b.

Figure 4:
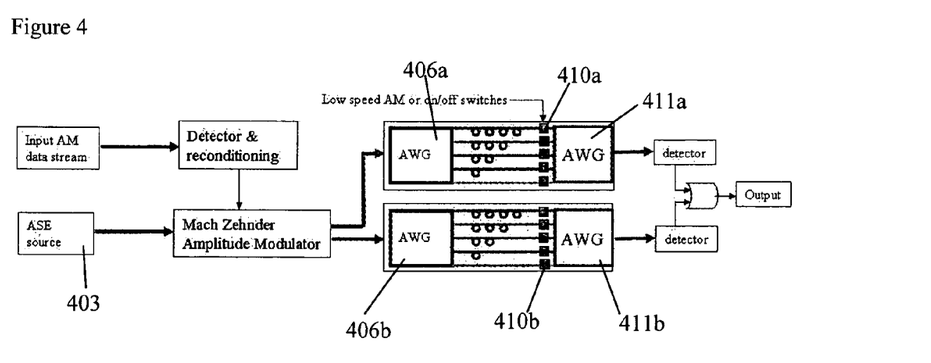
FIG. 4 shows another embodiment of the correlator of the present invention using WDM.

FIG. 4 shows an embodiment, which uses wavelength division multiplexing components. An amplified stimulated emission (ASE) source 403 is used to provide a broad-band optical input, typically 1525-1565 nm which is divided into two beams via an amplitude modulator as described above. Instead of an intensity beamsplitter however each modulated signal is passed to a wavelength demultiplexer 406a, 406b. This array wave-guide (AWG) component then splits the spectrum into 32 bands, which can then be delayed appropriately before being recombined using a second AWG device 411a, 411b. This system is very efficient at recombining the delayed signals, allowing the output to be connected directly to a photodetector.

In this embodiment rather than use an SLM, low speed amplitude modulating switches 410a, 410b are used on the individual delay lines. The low speed switch/AM elements incorporated into the recombining portion, are equivalent to the SLM function described above, and need only be on/off format. If necessary, AM elements can be used as opposed to switches, to flatten the ASE response. These components are COTS items known as variable optical attenuator arrays (VOAAs).

Figure 5:
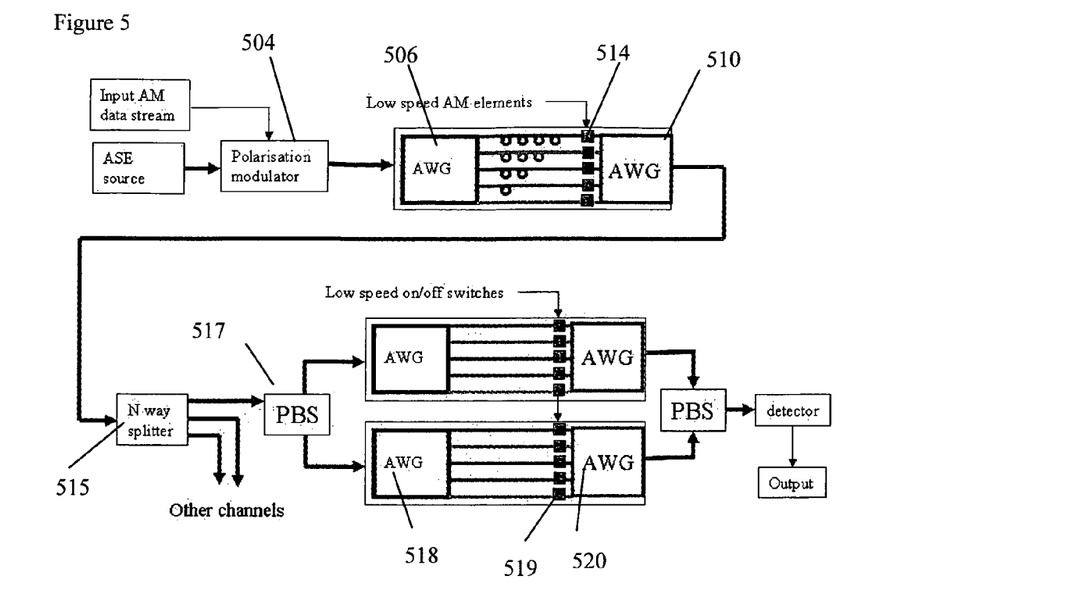
FIG. 5 shows an embodiment of the correlator which allows produces several copies of the parallel optical signals.

In order to extend the system to many channels, it may be possible to use polarisation to carry the state (1 or 0) information, and to split the output of the delay system many times, each output feeding a separate search engine. The search engines are then COTS "reconfigurable optical add drop multiplexer" (ROADM) units. FIG. 5 shows such an arrangement.

An ASE source provides a broad-band optical signal as described above. In this embodiment however this signal is modulated not in amplitude in response to the input data but by polarisation. Polarisation modulator 504 applies an orthogonal polarisation modulation for 1s and 0s. This polarisation modulated signal is passed to wavelength demultiplexer 506 which splits the beam into several different wavelength bands, each of which is passed to a different optical delay. Each optical delay may be provided with a low speed amplitude modulating element 514 to provide intensity calibration of the different channels. The optical delay produces a parallel optical signal, which is then combined by multiplexer 510. The combined signal therefore has a plurality of different wavelength ranges encoded with polarisation modulation data and with a wavelength dependent delay applied.

This signal is split into a number of different channels by splitter 515. Each channel passes to a polarisation dependent beam splitter 517 which will direct the radiation to one of two demultiplexers 518 depending on the polarisation state. The action of polarisation dependent beam splitter 517 is to inherently separate the optical signal into two separate signals, one in which bright pulse represent 1 and dark pulses 0 and the other where the reverse is true. The demultiplexers 518 restore the signal to a plurality of different channels based on the wavelength and these channels are switched to be active or not by amplitude modulating switches 519. The output of each bank of switches 519 can be recombined via the secondary AWGs 520, as in the embodiments described above. In this configuration, however, the pair of complementary channels can be recombined and passed to the detectors, only requiring one detector per pair. The in-fibre nature of this combination step is particularly useful, as it maintains a single-mode fibre waveguide which is compatible with the small diameters of fast detectors.

This embodiment therefore offers a compact means of generating copies of the parallel optical signals each of which can be passed to a different search engine. The configuration of the switches in each search engine can be different representing a different reference search term.

Figure 6:
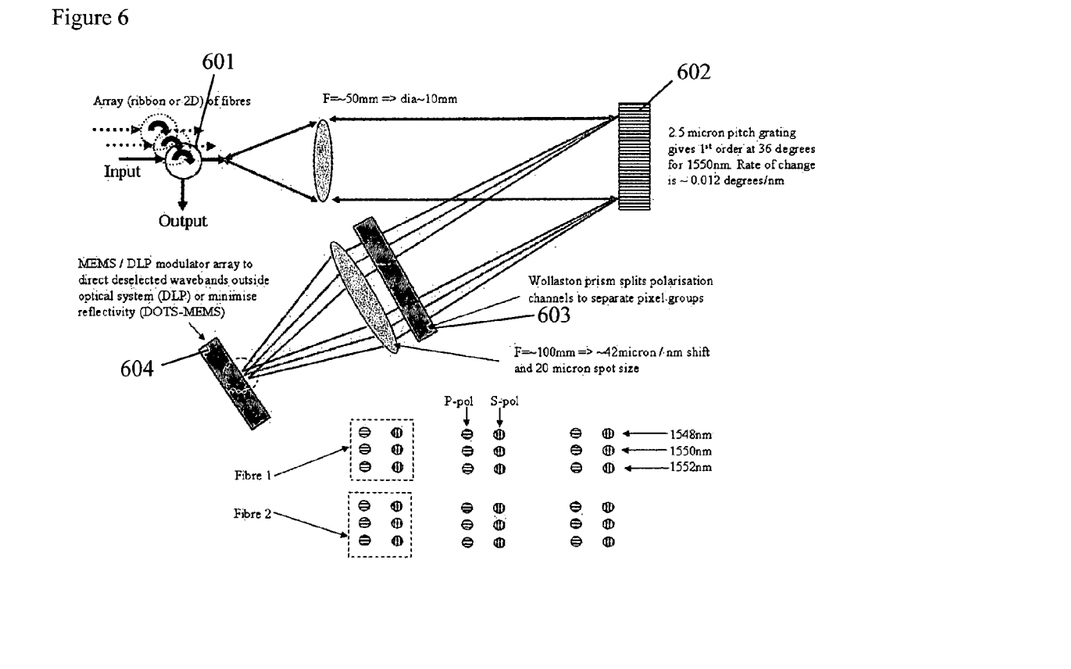
FIG. 6 shows the arrangement of a micro-mirror array as the channel select means.

As the amplitude modulating technique described above only requires on/off keying of individual wavelength bands, it is possible then to use commercially available digital light projection (DLP) modulators (from screen projectors) to switch pixels corresponding to wavelength channels. In order to split the wavelength channels, a grating is the obvious choice, however, to ensure simple alignment, a cats-eye configuration is used at the modulator to ensure automatic self-alignment of the fibre system. FIG. 6 shows the configuration.

A circulator 601 at the input ensures that the self-aligned return signal acts as output. A grating 602 with blazed spacing of approximately 2.5 microns should provide ~0.012 degrees per nm angular shift of the beams, which translates to ~42 microns/nm in the focal plane of a 100 mm lens. This "cats-eye" configuration should provide flat wavefronts at the focus (Gaussian beam waist), which means that a MOEMS modulator is also an option.

In addition, the orthogonally polarised bit channels (1's and 0's analysis) can be covered by incorporation of a Wollaston prism 603 (or similar) into the beam path to displace the two polarisation channels by a few pixels.

A further addition would allow use of 1D ribbon or 2D arrays of input fibres to replicate the search channels, as shown.

It is also possible that the tilting action of the DLP SLM 604 could be used to send the returning wavelengths down a second optical path, translated due to the cat's eye configuration, so as to exit via separate fibres. This would save the cost of the circulators, but may require additional alignment effort. This constitutes a fully functional Add-Drop configuration.

The DLP typically has ~17 micron pixels and tilts by 12 degrees in 2 directions, with a flat rest state. The cats eye configuration is not overly sensitive to tilt errors, but with 100 mm focal length, the 12 degree tilt will send the return beam back at 24 degrees, shifting it ~40 mm of axis at the lens. This is well outside the 10 mm beam diameter of the preliminary design shown above, and should thus provide a very good extinction ratio.

The reflective grating 602 could equally well be replaced by a transmissive phase grating or an Amici prism (refractive) if suitable materials are available for the wavelength required.

Figure 7:
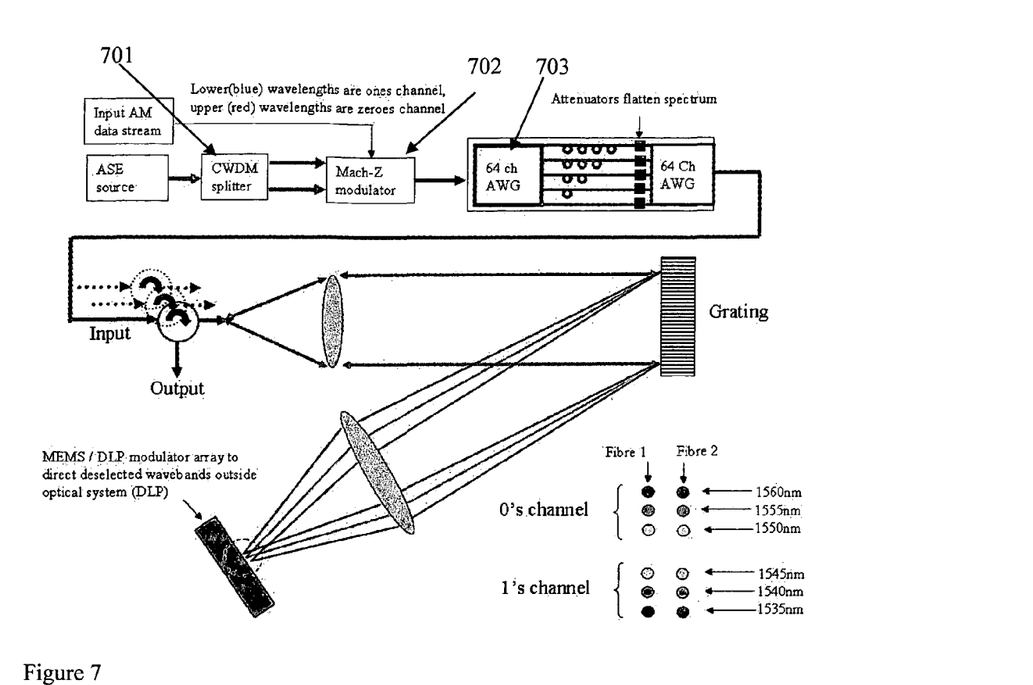
FIG. 7 shows the arrangement in which two groups of DWDM wavelength bands are used to carry the two (orthogonal) AM channels.

FIG. 7 depicts another alternative configuration in which the two orthogonal channels (carried in orthogonal polarisation states in the above descriptions) are carried in separate groups of DWDM bands. In order to realise this, a coarse wavelength division multiplexer (CWDM) component 701, sometimes known as a blue/red splitter, is used to separate the sections of the spectrum. A Mach-Zehnder amplitude modulator 702 then switches one or the other group of DWDM bands on, representing the input binary datastream in coarse wavelength band. An AWG with double the normal channel count is then needed to separate the channels and impose the necessary delays on the beams, one set for each coarse band. The remainder of the system is as before, except that the 64 pixels that are driven at the SLM are now 64 wavelengths in a row instead of 2 rows of 32.

Figure 8:
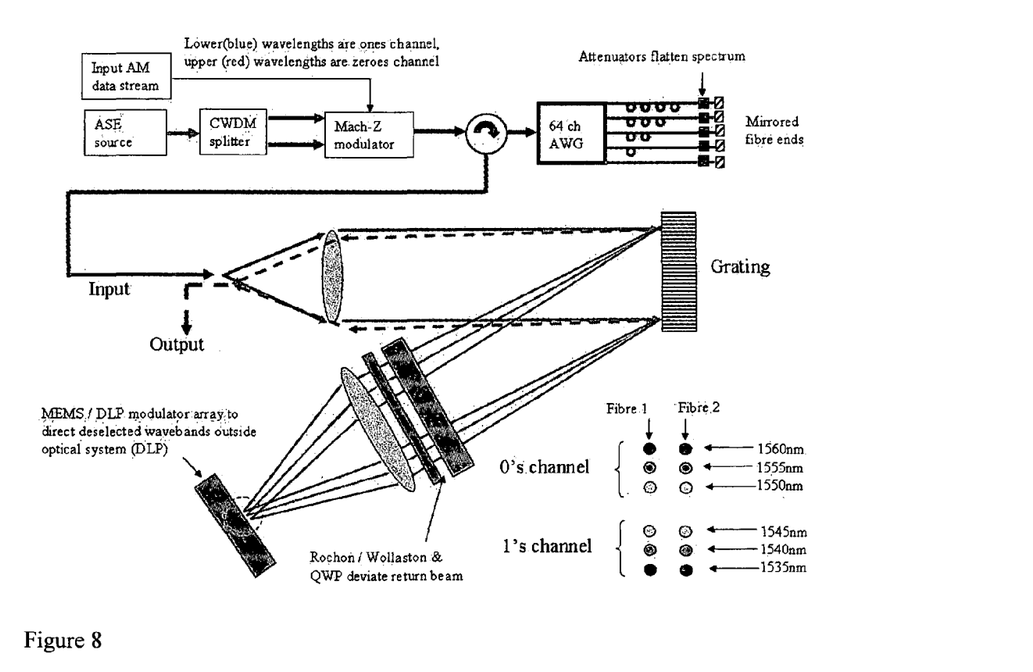
FIG. 8 shows one of several possible alternative configurations, utilising the AWG in reflective mode and a quarter wave plate to minimise the costs of circulator components.

FIG. 8 shows 2 further options that can be used to optimise the system. Firstly, the pair of AWGs can be replaced by a circulator followed by a single AWG whose fibres are reflection coated at the required delay length. This reduces component count and cost, but also ensures matched properties of the split and combine functions, which are now implemented by one and the same part. Secondly, the use of one quarter wave plate after the Rochon prism can be used to deflect the returning beams to a different position at the input. This allows the system to use a second array of fibres for the optical output, which removes the need for a number of circulators.

Figure 9:
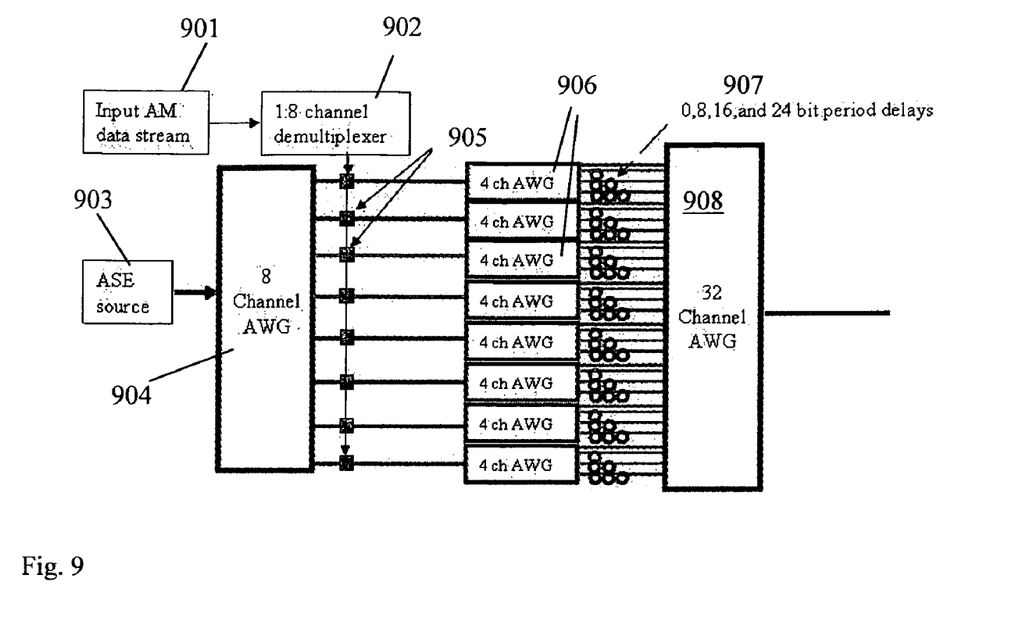
FIG. 9 illustrates how the speed of operation of the modulating and detecting components can be reduced through the use of a demultiplexer.

The embodiments described above all operate at the speed of the input data, i.e. the detectors and modulators need to be able to operate at the bit rate of the input data. FIG. 9 shows an embodiment which includes a demultiplexer on the input amplitude modulated data stream to reduce the speed required for the rest of the system. As shown in FIG. 9 the input data stream 901 is input to a 1:8 channel demultiplexer 902. As one skilled in the art will readily understand, the demultiplexer 902 effectively reads in a certain number of data values, in this case eight, before outputting them all simultaneously on different channels and reading in the next set of data values. This inherently provides a parallel output at a reduced speed, in this case one eighth, of the input data rate.

A broad-band ASE 903 illuminates a 1 to 8 array waveguide (AWG) splitter 904 to provide eight initial channels corresponding to the eight output channels of the demultiplexer 902. Each output channel of the demultiplexer 902 controls a modulator 905 acting on one of the eight initial channels. As will be clear the modulators 905 need to work at the speed of the output of the demultiplexer which, as mentioned, is reduced from the input data rate by a factor of eight.

Each of the eight initial channels is then further divided by a 1 to 4 array waveguide splitter 906. Each of the outputs of the 1 to 4 array waveguide splitter 906 has an incremental delay but this time the difference in successive delays is equal to eight times the bit duration. Thus the incremental delays on the four outputs of each of the 1 to 4 array waveguide splitter 906 are 0, 8, 16 and 24 times the bit period. This means that at any time the current eight bits of the signal with be present at the output of the delay lines having zero incremental delay, the previous eight bits will be output at the delay lines having an incremental delay of eight times the bit duration and the delays lines with 16 and 24 bit period delays will output previous bits 17 to 24 and 25 to 32 respectively. In this way the apparatus creates a parallel signal of 32 channels which is only updated at an eighth of the input data rate. Each update does, of course, change the data of the parallel signal by eight bits rather than just one as described previously—however for many applications the data will be presented byte-wise and hence any correlation across a byte-boundary is meaningless.

It will be clear that FIG. 9 shows only part of the correlator system. If the modulators 905 are polarisation modulators operating in the same manner as polarisation modulator 504 described in FIG. 5, the resulting 32 channel parallel polarisation modulated signal can be combined by a 32 channel AWG combiner 908 and passed to the N way splitter and polarising beam splitter arrangement such as shown in FIG. 5. Alternatively the apparatus shown in FIG. 9 could form half of a correlator system and be used to form one of the two parallel optical signals. In this arrangement modulators 905 would be amplitude modulators and channel select means (not shown) would be arranged to act on the 32 bit channel parallel signal before it was recombined by combiner 908 and passed onto a suitable detector.

The invention claimed is:

1. A correlation apparatus comprising a parallel optical signal generator for converting an input data stream into a first parallel optical signal and a second parallel optical signal, the parallel optical signal generator comprising an optical source, wherein the first parallel optical signal is amplitude modulated such that a high intensity represents a binary 1 and a low intensity represents a binary 0 and the second parallel optical signal is amplitude modulated such that a high intensity represents a binary 0 and a low intensity represents a binary 1, the correlation apparatus further comprising at least one detector for detecting a total intensity of the first and the second parallel optical signals and a channel selector for selectively preventing radiation in selected channels of the first and second parallel optical signals from reaching the detector.

2. A correlation apparatus as claimed in claim 1 wherein the channel selector acts on the first and second parallel optical signals and blocks all channels in the first and second parallel optical signals which would be high intensity for a search term and wherein a low intensity output at the detector indicates a match between the search term and data from the input data stream.

3. A correlation apparatus as claimed in claim 1 wherein the parallel optical signal generator further comprises a beam divider to divide the output from the optical source into first and second beams, the correlation apparatus further comprising an amplitude modulator for amplitude modulating the first beam in response to the input data signal to provide a first optical serial output in which a high intensity represents a binary 1 and a low intensity represents a binary 0 and for amplitude modulating the second beam in response to the input data signal to provide a second serial output in which a high intensity represents a binary 0 and a low intensity represents a binary 1.

4. A correlation apparatus as claimed in claim 1 wherein the parallel optical signal generator further comprises a beam divider to divide the output from the optical source into a first beam and a second beam, the correlation apparatus further comprising a polarisation modulator acting on the output of the optical source to provide a polarisation modulated signal wherein the beam divider comprises a polarisation sensitive beam divider.

5. A correlation apparatus as claimed in claim 3 further comprising an optical serial-to-parallel convertor for converting the first serial optical signal into the first parallel optical signal and the second serial optical signal into the second parallel optical signal.

6. A correlation apparatus as claimed in claim 5 wherein the optical serial-to-parallel convertor comprises a plurality of optical delay lines, each successive delay line being incrementally delayed with respect to the previous one.

7. A correlation apparatus as claimed in claim 1 wherein the channel selector comprise one or more of an amplitude modulating spatial light modulator, an array of optical switches, an optical shutter array, a micro-mirror array or a reconfigurable mask.

8. A correlation apparatus as claimed in claim 7 wherein the channel selector comprises at least one amplitude modulating spatial light modulator arranged in the optical path of the first and second parallel optical signals.

9. A correlation apparatus as claimed in claim 1 wherein the optical source is a broad band optical source.

10. A correlation apparatus as claimed in claim 9 wherein the parallel optical signal generator comprises a wavelength demultiplexer to separate a plurality of wavelengths into different optical delay lines, and wherein outputs of each different optical delay line in the plurality of optical delay lines is combined by a wavelength multiplexer.

11. A correlation apparatus as claimed in claim 9 wherein the parallel optical signal generator comprises a wavelength division multiplexer for splitting the output of the broad band optical source into a first wavelength band and a second wavelength band, an amplitude modulator for amplitude modulating the signal in the first wavelength band in response to the input data signal to provide a first optical serial output in which a high intensity represents a binary 1 and a low intensity represents a binary 0 and for amplitude modulating the signal in the second wavelength band in response to the input data signal to provide a second optical serial output in which a high intensity represents a binary 0 and low intensity represents a binary 1, and an optical serial-to-parallel convertor for converting the first serial optical signal into the first parallel optical signal and the second serial optical signal into the second parallel optical signal.

12. A correlation apparatus as claimed in claim 1 wherein the parallel optical signal generator produces several copies of the first and the second parallel optical signals.

13. A correlation apparatus as claimed in claim 12 wherein the parallel optical signal generator comprises a broad band optical source, a polarisation modulator arranged to modulate the polarisation of the output of the optical source in response to the input data stream, a wavelength demultiplexer for dividing the polarisation modulated signal into a plurality of different wavelength bands each wavelength being passed to a different optical delay line, the delay lines being arranged to have incremental delays to create a parallel optical polarisation modulated signal, further comprising a multiplexer for combining the parallel optical polarisation modulated signal, a beam divider acting on the output of the multiplexer, each output from the beam divider being passed through a polarisation sensitive beam splitter directing the radiation to either a first or second wavelength demultiplexer depending on its polarisation.

14. A correlation apparatus as claimed in claim 10 wherein an output of the multiplexer is incident on a diffractive optical system arranged to split the optical signal dependent on wavelength and polarisation so as to provide the first and second parallel optical signals, said first and second parallel optical signals being arranged to be incident on at least one reflective mode spatial light modulator, the reflective mode spatial light modulator being arranged to reflect radiation back to the diffractive optical system in any channels which would correspond to a low intensity for a desired search term for matching the data from the input data stream.

15. A correlation apparatus as claimed in claim 14 wherein a circulator is arranged between the output of the multiplexer and the diffractive optical system so as to pass radiation output from the multiplexer to the diffractive optical system and to pass any radiation reflected back from the reflective spatial light modulator and recombined at the diffractive optical system to the detector.

16. A correlation apparatus as claimed in claim 14 wherein radiation reflected back from the reflective spatial light modulator and recombined at the diffractive optical system is incident on the detector or on an input end of a waveguide adapted to guides said radiation to the detector.

17. A correlation apparatus as claimed in claim 14 wherein the diffractive optical system comprises a diffraction grating and a polarisation dependent splitter.

18. A correlation apparatus according to claim 1 wherein the parallel optical signal generator comprises a 1:N demultiplexer, wherein each optical channel of each parallel optical signal further comprises a beam splitter and a plurality of optical delays of incrementally increased delay, the incremental delay being equal to N times the bit rate.

19. A correlation apparatus as claimed in claim 4 further comprising an optical serial-to-parallel convertor for converting the first serial optical signal into the first parallel optical signal and the second serial optical signal into the second parallel optical signal.

20. A correlation apparatus as claimed in claim 19 wherein the optical serial-to-parallel convertor comprises a plurality of optical delay lines, each successive delay line being incrementally delayed with respect to the previous one.

* * * * *